US012059789B2

(12) United States Patent
Chen

(10) Patent No.: US 12,059,789 B2
(45) Date of Patent: Aug. 13, 2024

(54) ROTATION DIRECTION SWITCHING DEVICE FOR A PNEUMATIC TOOL

(71) Applicant: APACH INDUSTRIAL CO., LTD., Taichung (TW)

(72) Inventor: Jung-Huo Chen, Taichung (TW)

(73) Assignee: Apach Industrial Co., Ltd., Taichung (TW)

( * ) Notice: Subject to any disclaimer, the term of this patent is extended or adjusted under 35 U.S.C. 154(b) by 12 days.

(21) Appl. No.: 18/069,713

(22) Filed: Dec. 21, 2022

(65) Prior Publication Data

US 2024/0208027 A1 Jun. 27, 2024

(51) Int. Cl.
*B25F 5/00* (2006.01)
*B25F 5/02* (2006.01)

(52) U.S. Cl.
CPC ................ *B25F 5/001* (2013.01); *B25F 5/02* (2013.01)

(58) Field of Classification Search
CPC .................................. B25F 5/001; B25F 5/02
See application file for complete search history.

(56) References Cited

U.S. PATENT DOCUMENTS 3,037,740 A * 6/1962 Sheps ..................... B25B 21/00 251/285
3,129,796 A * 4/1964 Karl ........................ B25B 21/02 173/93.5
3,510,099 A * 5/1970 Crump .................... F16K 35/06 173/169
3,924,693 A * 12/1975 Whitehouse ............ B23B 45/04 91/59
5,303,781 A * 4/1994 Lin ........................... B25F 5/00 173/169
5,377,769 A * 1/1995 Hasuo ....................... B25F 5/00 173/169
5,797,462 A * 8/1998 Rahm ..................... B25B 21/00 173/169
6,047,780 A * 4/2000 Lin ......................... B25B 21/00 173/221
6,708,779 B2 * 3/2004 Taga ....................... B25B 21/02 173/104
7,431,102 B2 * 10/2008 Hua ........................ B25B 21/00 173/104
7,594,549 B2 9/2009 Hua
8,267,190 B2 * 9/2012 Li ............................. B25F 5/00 173/104
9,254,561 B2 * 2/2016 Hua .......................... B25F 5/02
(Continued)

*Primary Examiner* — Lucas E. A. Palmer
(74) *Attorney, Agent, or Firm* — Wang Law Firm, Inc.

(57) ABSTRACT

A rotation direction switching device of a pneumatic tool includes a valve sleeve, an intake valve and a control member disposed in a tool body. Under a condition that a pivot connecting portion of the control member is pivotally connected to a pivot shaft of the tool body and each driving portion of the control member can drive a driven portion of the intake valve, the control member can drive the intake valve in an arc trajectory to rotate, so that when the control member is in the forward or the reverse rotation control position, the vent of the intake valve is in communication with corresponding one of clockwise and the reverse rotation holes of the valve sleeve, so as to control the pneumatic tool to rotate forward or reversely. Therefore, the assembly cost and production cost can be effectively reduced.

6 Claims, 8 Drawing Sheets

(56) References Cited

U.S. PATENT DOCUMENTS

| | | | | |
|---|---|---|---|---|
| 9,962,816 | B2 * | 5/2018 | Chen | F16K 35/04 |
| 10,421,174 | B2 | 9/2019 | Wu et al. | |
| 10,590,770 | B2 | 3/2020 | Griffin et al. | |
| 11,364,613 | B2 * | 6/2022 | Huang | B25F 5/005 |
| 2003/0075348 | A1 * | 4/2003 | Eardley | B25F 5/00 173/169 |
| 2008/0066941 | A1 * | 3/2008 | Kobayashi | B25F 5/00 173/218 |
| 2008/0251269 | A1 * | 10/2008 | Hua | B25B 21/00 173/104 |
| 2012/0138329 | A1 * | 6/2012 | Sun | B25F 5/02 173/221 |
| 2012/0325510 | A1 * | 12/2012 | Sun | B25B 21/02 173/91 |
| 2012/0325511 | A1 * | 12/2012 | Cheng | B25B 21/00 173/169 |
| 2013/0075123 | A1 * | 3/2013 | Sun | B25F 5/00 173/221 |
| 2013/0156622 | A1 * | 6/2013 | Lee | B25B 21/00 417/545 |
| 2014/0020923 | A1 * | 1/2014 | Su | B25B 21/02 173/218 |
| 2016/0075008 | A1 * | 3/2016 | Wu | B25B 21/00 173/221 |
| 2016/0258291 | A1 * | 9/2016 | Griffin | F01C 1/3441 |
| 2016/0332287 | A1 * | 11/2016 | Chen | B25B 21/00 |
| 2021/0394351 | A1 * | 12/2021 | Bothmann | B25F 5/005 |

* cited by examiner

ROTATION DIRECTION SWITCHING DEVICE FOR A PNEUMATIC TOOL

BACKGROUND

Field of the Invention

The present invention relates to a pneumatic tool, and more particularly to a rotation direction switching device of a pneumatic tool.

Description of Related Art

A pneumatic tool is a device with an air compressor for supplying compressed air as a working power source. FIG. 1 shows a rotating direction switching device of a pneumatic tool disclosed in the U.S. Pat. No. 7,594,549B2. Inside the pneumatic tool are provided a valve sleeve 11 and an intake valve 12, and outside the pneumatic tool is provided a control member 13 connected with the intake valve 12. By pressing the control member 13, the driving portion 131 of the control member 13 moves transversely to control the intake valve 12 to rotate forward or reversely, so that the intake valve 12 is in communication with corresponding one of the clockwise and counterclockwise rotation holes of the valve sleeve 11 to enable corresponding one of the forward and reverse rotation of the pneumatic tool.

Since the control member 13 moves linearly to drive the intake valve 12 to rotate as being pushed, the linear moving trajectory of the control member 13 must be long enough to control the actual steering of the intake valve 12. As a result, the total length of the control member 13 is too long, so that the two ends of the control member 13 protrude too much from the two ends of the gripping portion 141 of the tool body 14. Therefore, for the switching of rotation direction, the control member 13 must be pressed to the extremity to ensure the direction switching being successful, which leads to the defect that the direction switching control is relatively inexact. Moreover, the too long length of the control member 13 easily causes discomfort of the index finger and thumb in the process of pressing the control member 13.

In addition, a pneumatic rotating tool including a direction switching mechanism and a speed regulating mechanism is disclosed in the U.S. Pat. No. 10,421,174B2, and a direction switching mechanism for pneumatic or hydraulic tools is disclosed in the U.S. Pat. No. 10,590,770B2. Although they are equipped with a direction switching device to control the forward and reverse rotation of pneumatic tools, the design of the direction switching device in these prior patents is too complex, resulting in a high assembly cost and a production cost.

Furthermore, although a direction switching mechanism of a pneumatic tool disclosed in the U.S. Pat. No. 7,431, 102B2, and a pneumatic tool with a single controller for the switching of forward and reverse rotation and the speed regulation disclosed in the U.S. Pat. No. 10,590,770B2 are equipped with a direction switching device to control the forward and reverse rotation of the pneumatic tool, the direction switching mechanisms in these prior patents have a too large operation angle for the switching of the forward and reverse rotation due to a coaxial rotation design thereof, so that the direction switching mechanism protrude too much from both sides of the tool body of the pneumatic tool, resulting in the discomfort of the index finger and thumb during pressing the direction switching mechanisms.

SUMMARY

One objective of the present invention is to provide a rotation direction switching device of a pneumatic tool, which is mainly capable of solving one of the abovementioned problems.

Another objective of the present invention is to provide a rotation direction switching device of a pneumatic tool, which still can achieve the effect of similar horizontal switching, even though reducing the operating angle through the design of separated axes of rotation.

Yet another objective of the present invention is to provide a rotation direction switching device of a pneumatic tool, having the less assembly cost and less production cost.

To achieve the above objectives, a rotation direction switching device of a pneumatic tool provided by the invention is suitable for being installed to a tool body, the tool body includes an accommodating chamber and a pivot shaft located outside the accommodating chamber, and the rotating direction switching device includes: a valve sleeve fixed in the accommodating chamber of the tool body, and including a clockwise rotation hole and a counterclockwise rotation hole; an intake valve rotationally disposed in the valve sleeve, and including a vent selectively communicable with the clockwise rotation hole and the counterclockwise rotation hole, and a driven portion; and a control member being movable between a forward rotation control position and a reverse rotation control position by taking the pivot shaft of the tool body as a pivot center, and including a pivot connecting portion pivotally connected with the pivot shaft of the tool body, a driving portion for driving the driven portion, and two control portions being pressable and respectively located on two sides of the driving portion, wherein when the control member is in the forward rotation control position, the vent of the intake valve is in communication with the clockwise rotation hole of the valve sleeve; and when the control member is in the reverse rotation control position, the vent of the intake valve is in communication with the counterclockwise rotation hole of the valve sleeve.

The present invention has the following technical effects. When the pivot connecting portion of the control member is pivotally connected to the pivot shaft of the tool body and the driving portion of the control member is capable of driving the driven portion of the intake valve, the control member can drive the intake valve in an arc trajectory to rotate, so that when the control member is in the forward rotation control position, the vent of the intake valve is in communication with the clockwise rotation hole of the valve sleeve, and when the control member is in the reverse rotation control position, the vent of the intake valve is communication with the counterclockwise rotation hole of the valve sleeve, whereby the control member can control the pneumatic tool to rotate forward and reversely. Accordingly, the present invention can perform the control of the forward and reverse rotation of the pneumatic tool with less components and a simple structure, which can effectively reduce the assembly cost and production cost.

Preferably, a linear distance from each of the control portions of the control member to the pivot shaft is longer than a linear distance from the driven portion of the intake valve to the pivot shaft.

Preferably, the driven portion of the intake valve is a pillar, and the driving portion of the control member is a hollow.

Preferably, the intake valve is rotatable about a first axis, the control member is pivotable on the pivot shaft as a second axis, and the second axis and the first axis separate from each other.

Preferably, the pivot connecting portion and the driving portion of the control member are respectively located on two sides of the first axis.

Preferably, the tool body further includes a limiting rib adjacent to the accommodating chamber, the control member further includes a limiting indentation between the control portions, the limiting indentation includes a first limiting surface located at one of two opposite sides of the limiting rib, and a second limiting surface facing the first limiting surface and located at the other one of the two opposite sides of the limiting rib; when the control member is in the forward rotation control position, the first limiting surface is abutted against the one of the two opposite sides of the limiting rib; and when the control member is in the reverse rotation control position, the second limiting surface is abutted against the other one of the two opposite sides of the limiting rib. In this way, the rotation direction switching is relatively accurate.

DETAILED DESCRIPTION

Figure 1:
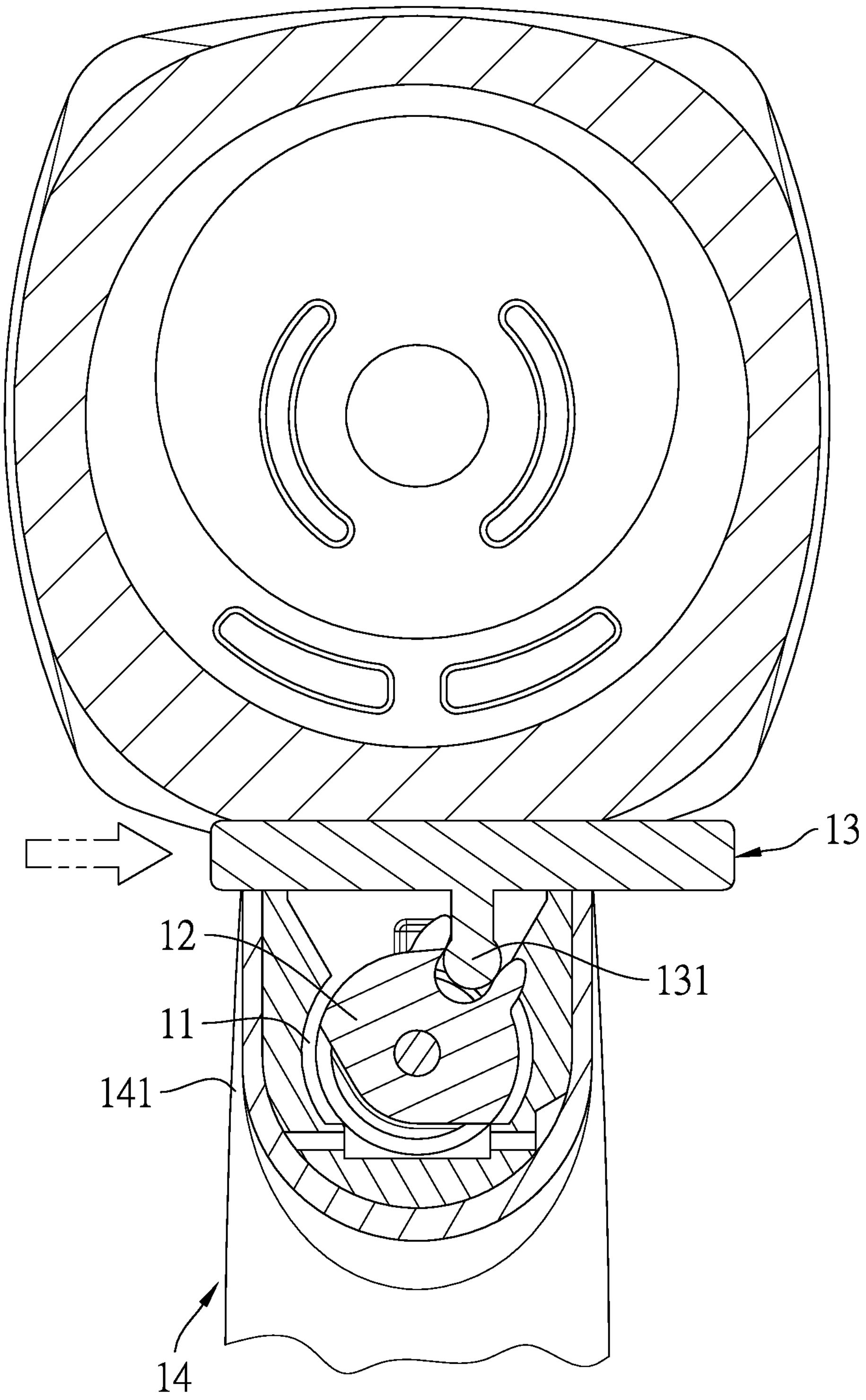
FIG.1 PRIOR ART
FIG. 1 shows a rotating direction switching device of a pneumatic tool disclosed in the U.S. Pat. No. 7,594,549B2.
Figure 2:
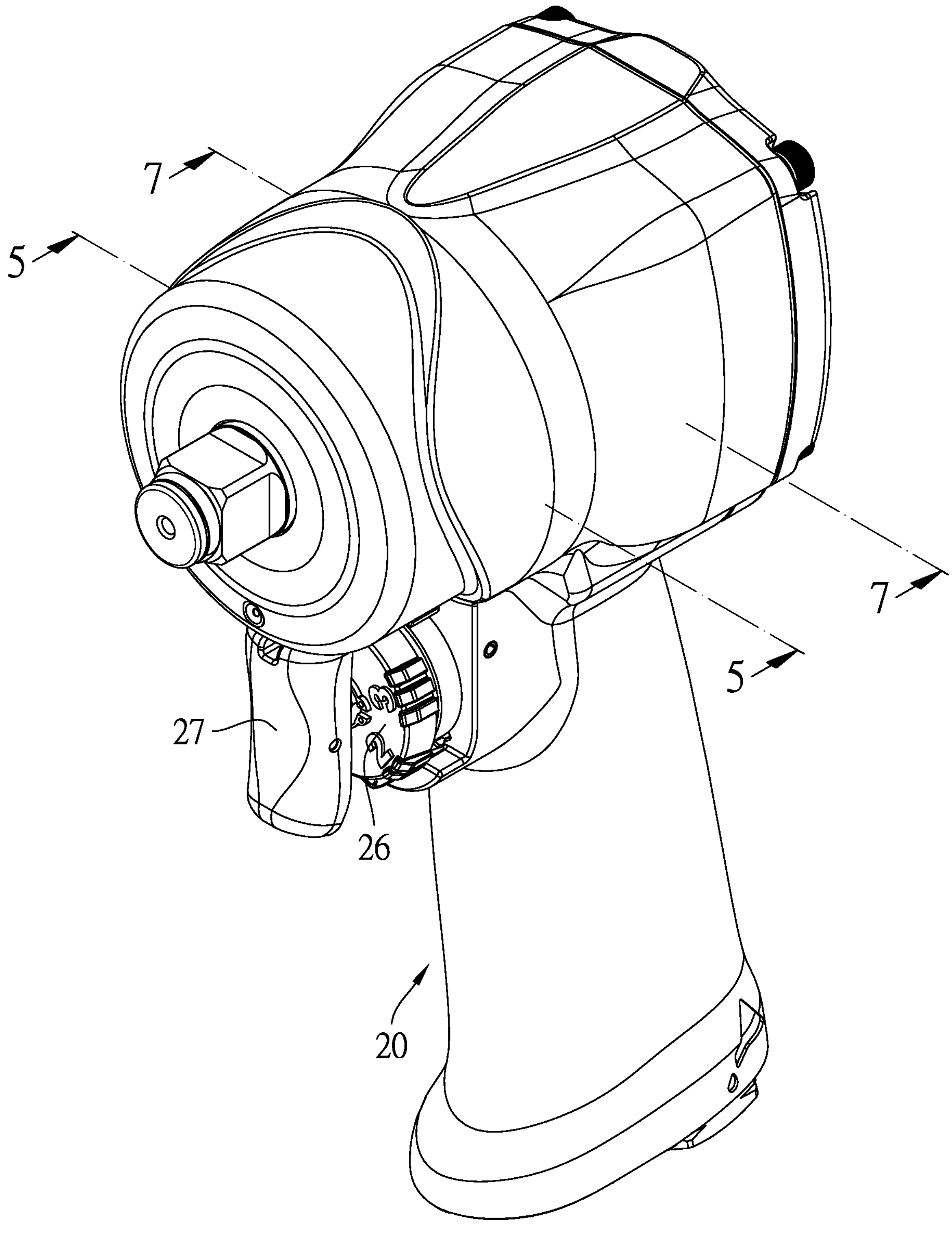
FIG. 2 is a perspective view of an embodiment of the invention assembled.
Figure 3:
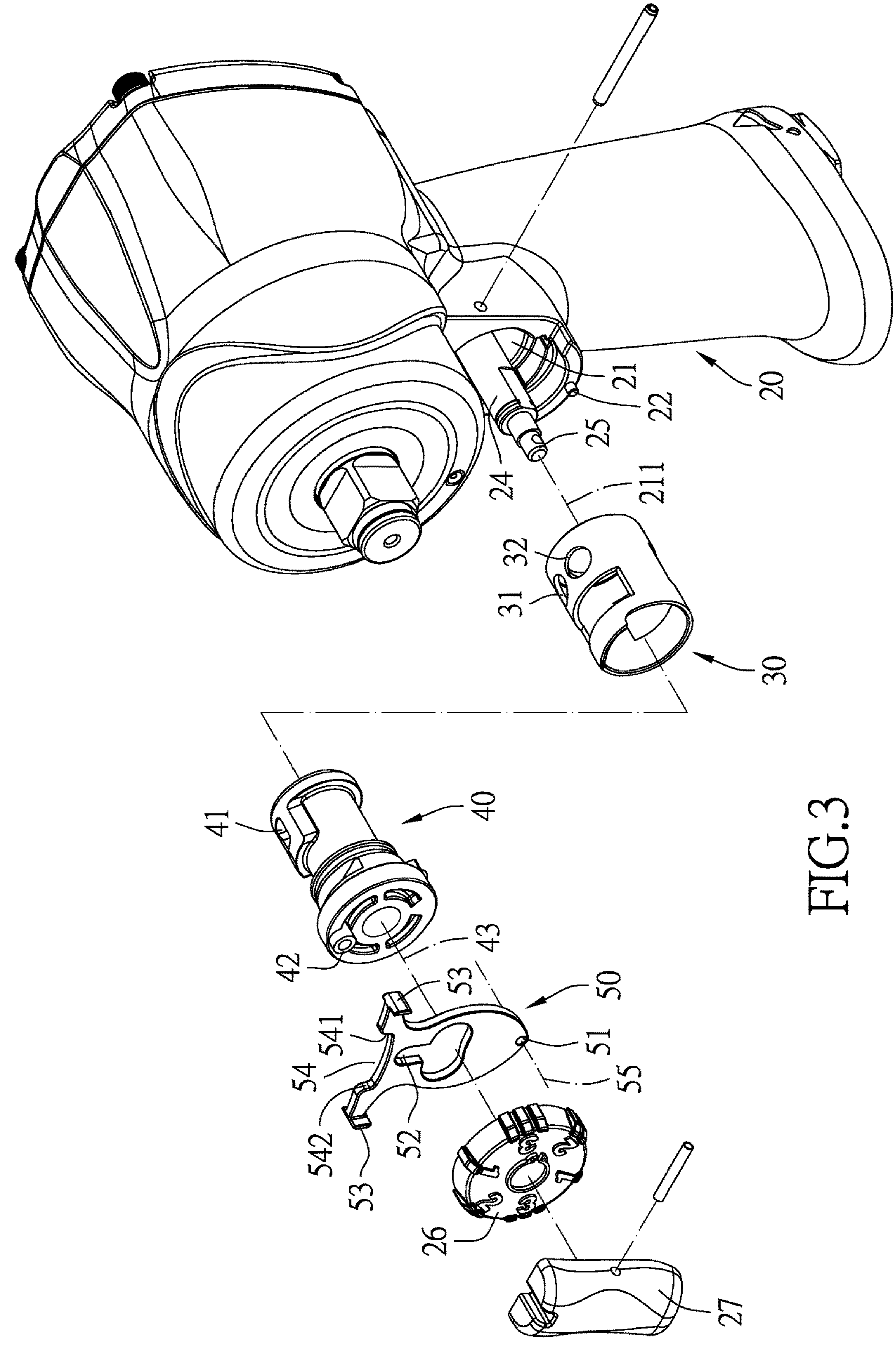
FIG. 3 is an exploded view of a part of an embodiment of the invention.
Figure 4:
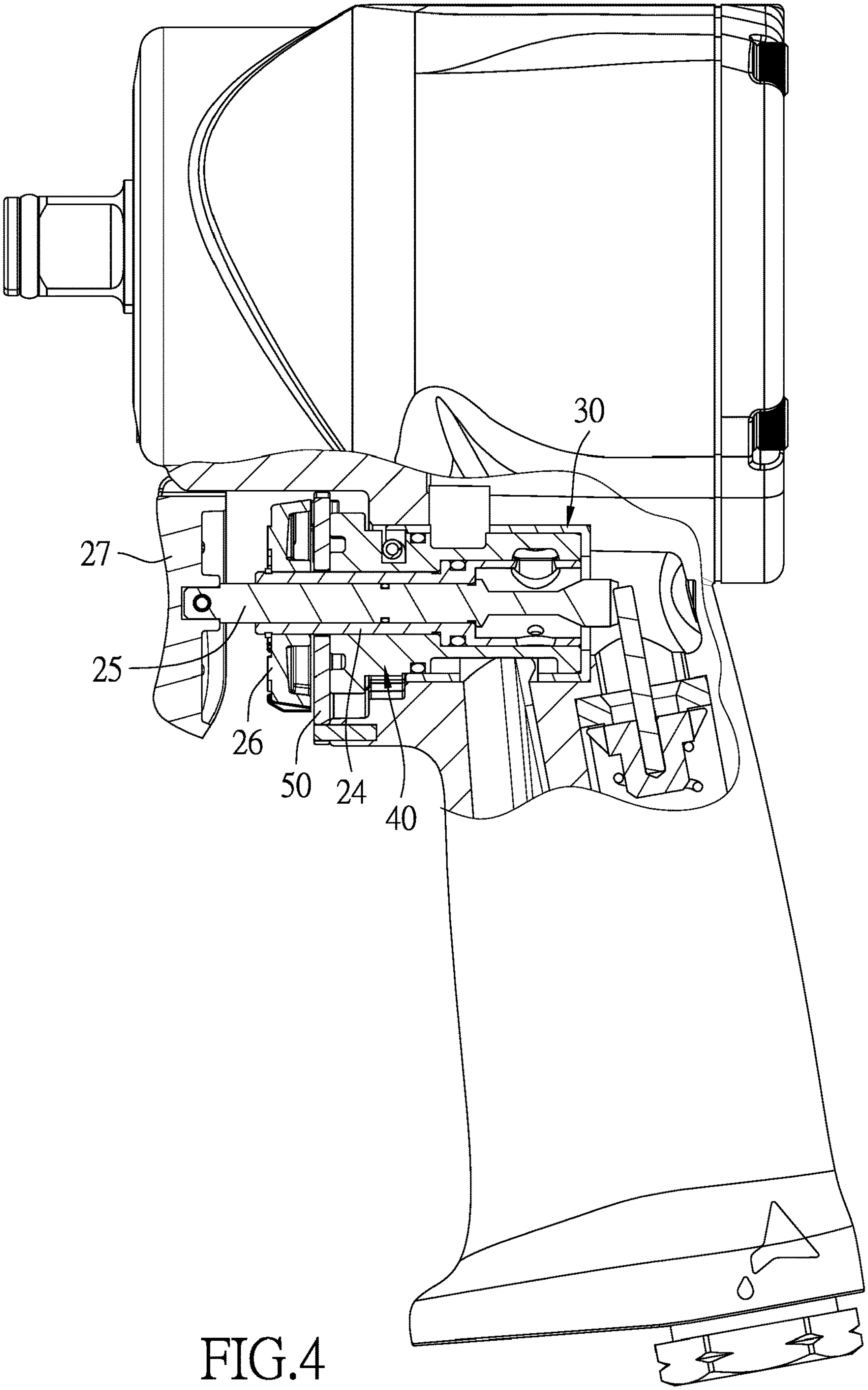
FIG. 4 is a cross sectional view of a part of an embodiment of the invention.

As shown in FIGS. 2 to 7, a rotation direction switching device of a pneumatic tool provided in an embodiment of the invention is suitable for being installed to a tool body 20. The tool body 20 includes a accommodating chamber 21, a pivot shaft 22 located outside the accommodating chamber 21, and a limiting rib 23 adjacent to the accommodating chamber 21. The accommodating chamber 21 is provided with a flow control shaft 24 and a starting control shaft 25 inserted into the flow control shaft 24. The flow control shaft 24 is connected with a flow control knob 26 to control the output torque of the pneumatic tool, and the starting control shaft 25 is connected by a trigger 27 to control the turn-on and turn-off of the pneumatic tool. In this embodiment, the accommodating chamber 21 has an axis 211, and the pivot shaft 22 and the limiting rib 23 are respectively located on the two opposite sides of the axis 211; and the rotating direction switching device essentially includes a valve sleeve 30, an intake valve 40, and a control member 50.

Figure 7:
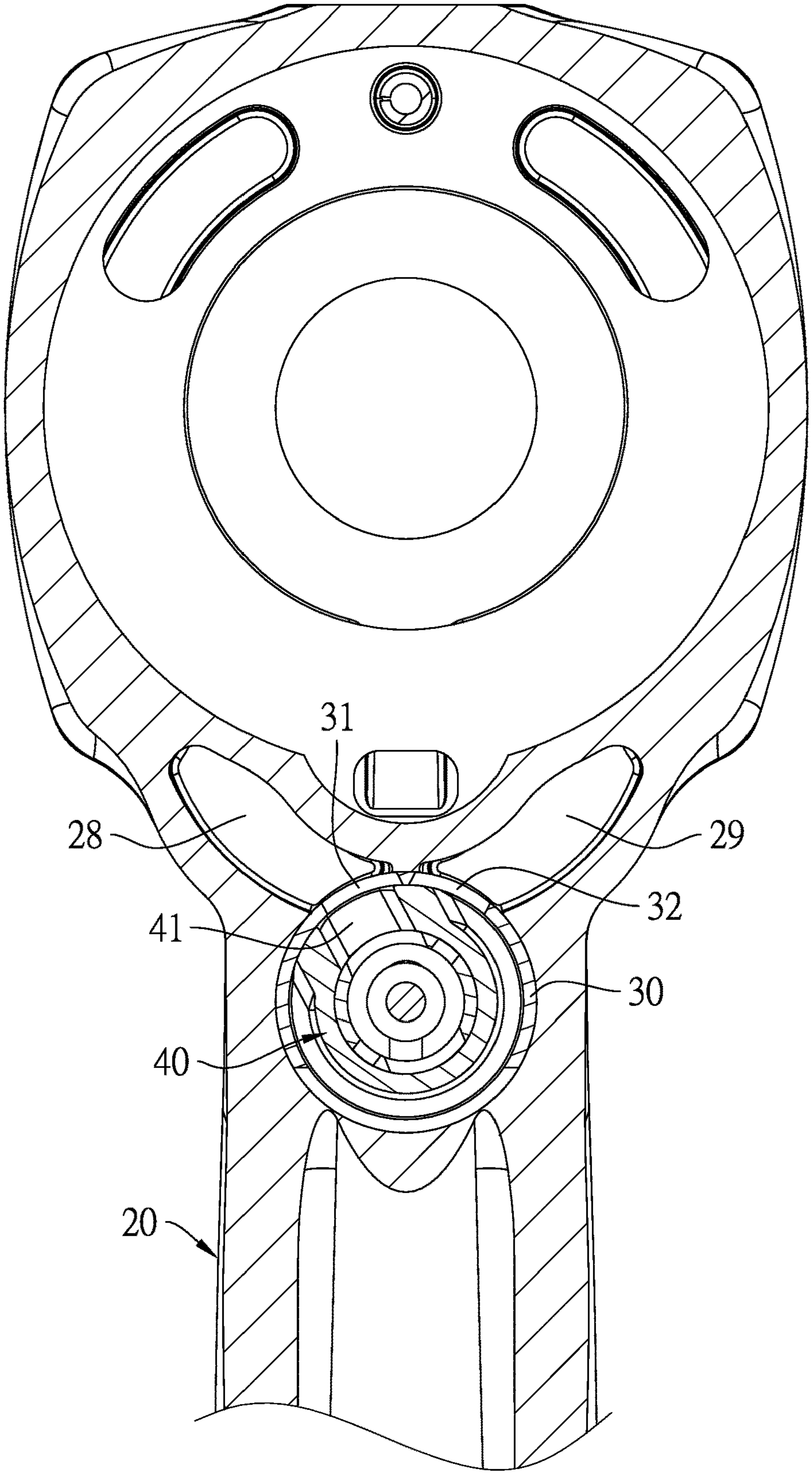
FIG. 7 is a cross sectional view taken long the line 7-7 in FIG. 2 and showing that the valve sleeve and the intake valve are disposed in the tool body.

The valve sleeve 30 is fixed in the accommodating chamber 21 of the tool body 20, and includes a clockwise rotation hole 31 and a counterclockwise rotation hole 32. As shown in FIG. 7, in this embodiment, the clockwise rotation hole 31 of the valve sleeve 30 is communicated with a clockwise rotation intake channel 28 of the tool body 20, and the counterclockwise rotation hole 32 of the valve sleeve 30 is communicated with a counterclockwise rotation intake channel 29 of the tool body 20.

Figure 8:
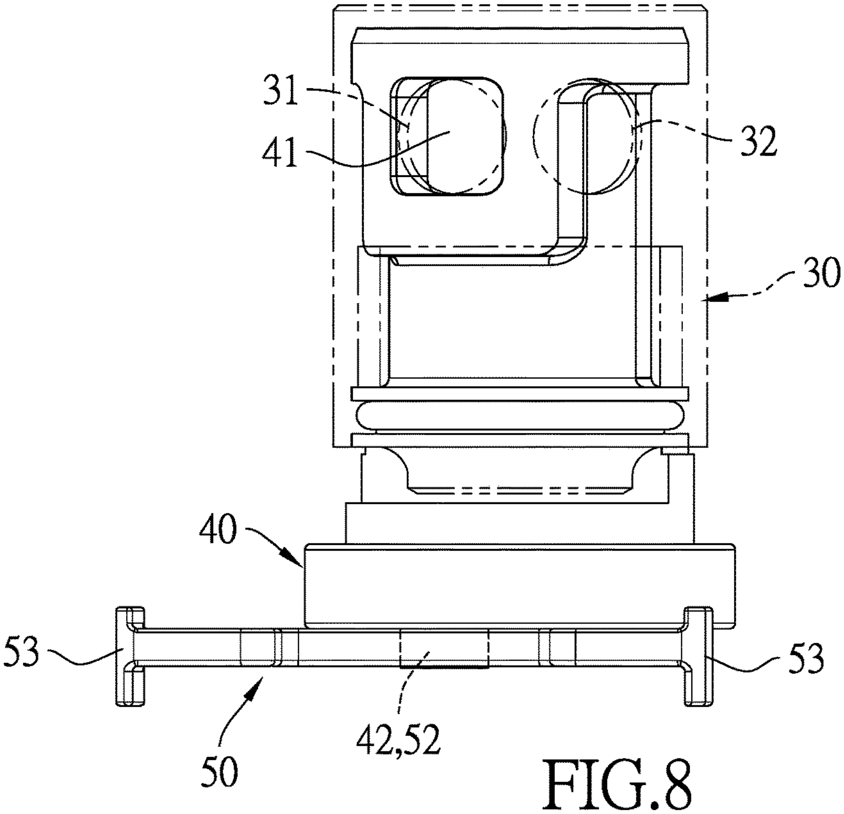
FIG. 8 is a schematic diagram of the embodiment of the invention in use, showing that the vent of the intake valve is in communication with the clockwise rotation hole of the valve sleeve.
Figure 9:
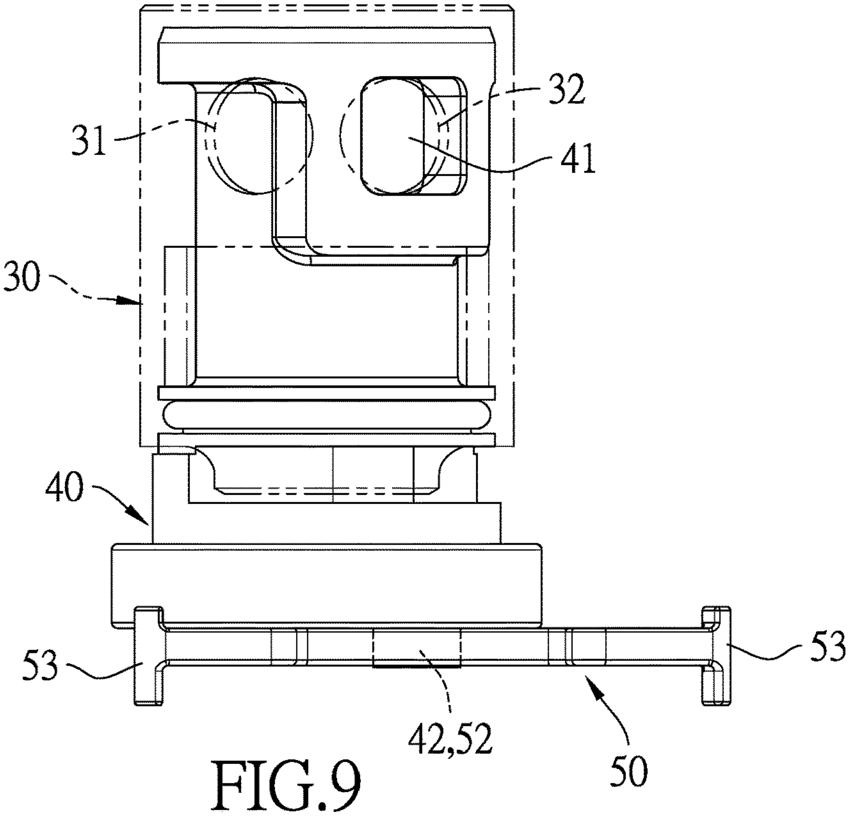
FIG. 9 is a schematic diagram of the embodiment of the invention in use, showing that the counterclockwise rotation hole of the intake valve is in communication with the valve sleeve.

The intake valve 40 is rotatably disposed in the valve sleeve 30, and includes a vent 41 and a driven portion 42, wherein the vent 41 is communicable with the clockwise rotation hole 31 of the valve sleeve 30 (as shown in FIG. 8) and is communicable with the counterclockwise rotation hole 32 of the valve sleeve 30 (as shown in FIG. 9). In this embodiment, the driven portion 42 of the intake valve 40 is a pillar, the intake valve 40 is sleeved on the flow control shaft 24 and the starting control shaft 25 inserted in the flow control shaft 24, and the intake valve 40 is rotatable about a first axis 43, which overlaps with the axis 211.

Figure 5:
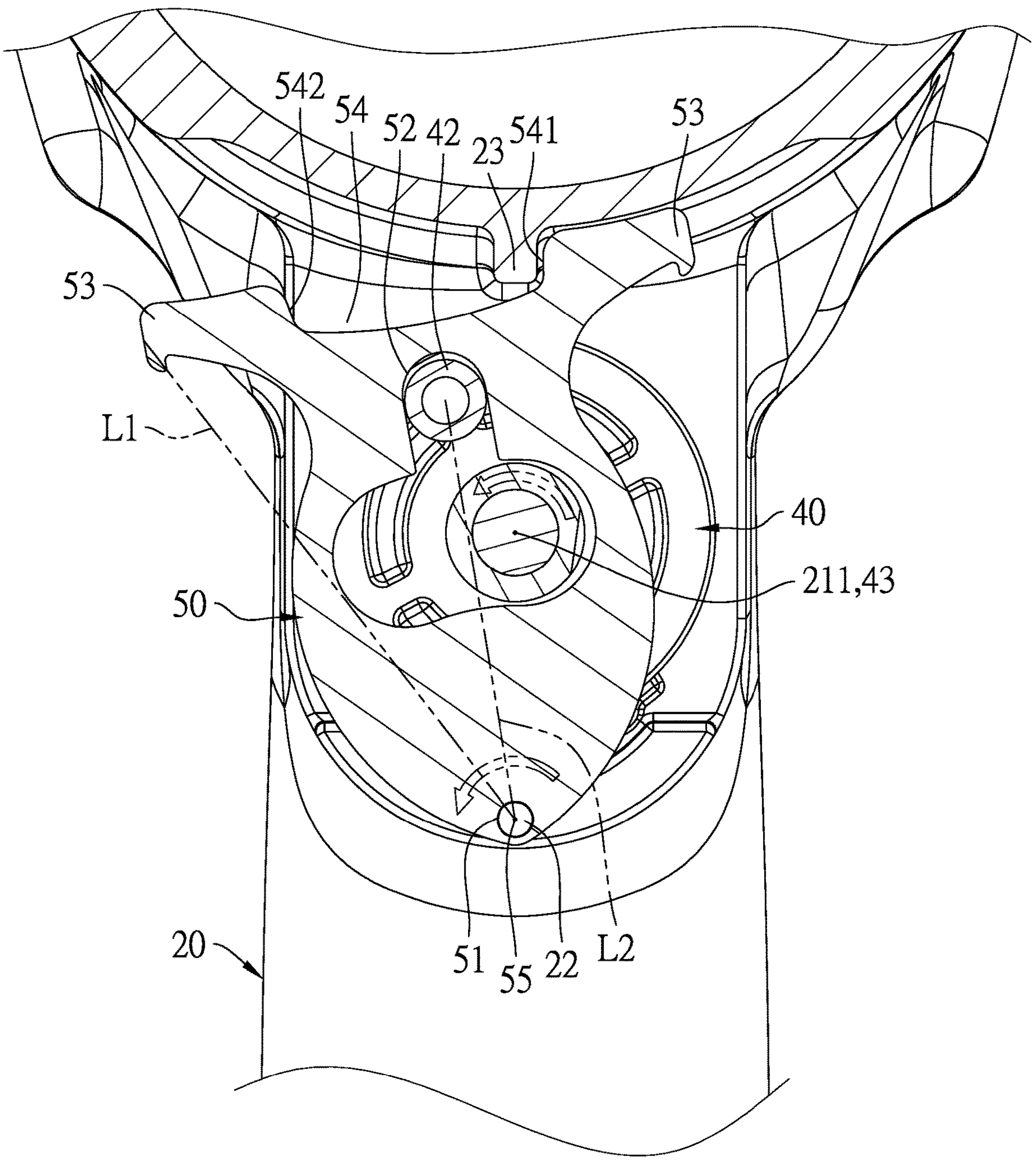
FIG. 5 is a cross sectional view taken along the line 5-5 of FIG. 2 and showing that the control member is in the forward rotation control position.
Figure 6:
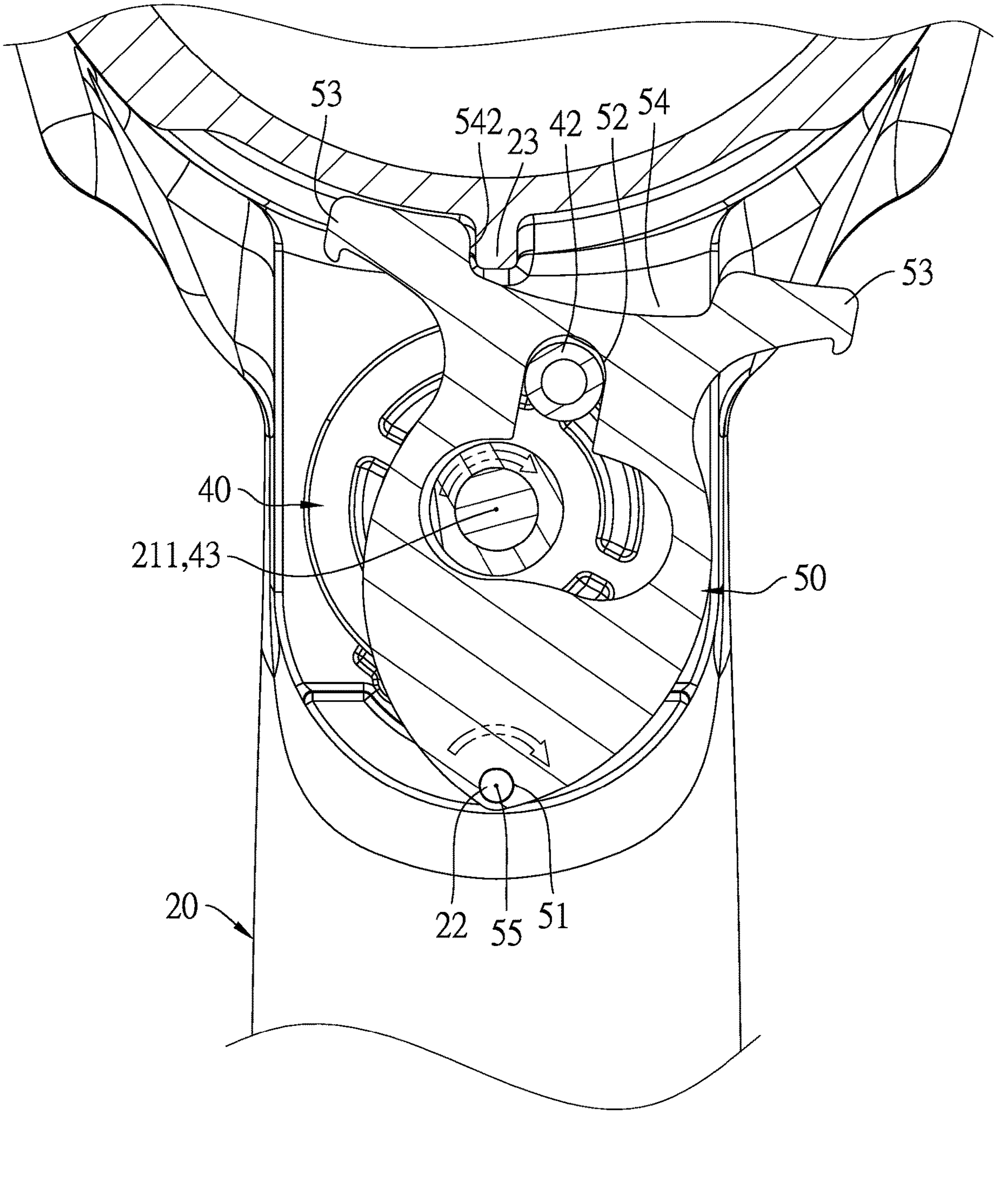
FIG. 6 is a schematic diagram of the embodiment of the invention in use, showing that the control member is in the reverse rotation control position.

The control member 50 is movable between a forward rotation control position (as shown in FIG. 5) and a reverse rotation control position (as shown in FIG. 6) by taking the pivot shaft 22 of the tool body 20 as a pivot center, and includes a pivot connecting portion 51 pivotally connected with the pivot shaft 22 of the tool body 20, a driving portion 52 for driving the driven portion 42 of the intake valve 40, and two control portions 53 that are pressable and respectively located on two sides of the driving portion 52. When the control member 50 is in the forward rotation control position (as shown in FIG. 5), the vent 41 of the intake valve 40 is in communication with the clockwise rotation hole 31 of the valve sleeve 30 (as shown in FIG. 8); when the control member 50 is in the reverse rotation control position (as shown in FIG. 6), the vent 41 of the intake valve 40 is in communication with the counterclockwise rotation hole 32 of the valve sleeve 30 (as shown in FIG. 9). In this embodiment, the pivot connecting portion 51 and the driving portion 52 of the control member 50 are respectively located on two sides of the first axis 43. The driving portion 52 of the control member 50 in the form of hollow can mutually engage with and drive the driven portion 42 in the form of pillar. In addition, a linear distance L1 from each control portion 53 of the control member 50 to the pivot shaft 22 is longer than a linear distance L2 from the driven portion 42 of the intake valve 40 to the pivot shaft 22; and the control member 50 further includes a limiting indentation 54 between the control portions 53, the limiting indentation 54 includes a first limiting surface 541 located at one of two opposite sides of the limiting rib 23 of the tool body 20, and a second limiting surface 542 facing the first limiting surface 541 and located at the other one of the two opposite sides of the limiting rib 23. When the control member 50 is in the forward rotation control position, the first limiting surface 541 is abutted against the one of the two opposite sides of the limiting rib 23 (as shown in FIG. 5); and when the control member 50 is in the reverse rotation control position, the second limiting surface 542 is abutted against the other one of the two opposite sides of the limiting rib 23 (as shown in FIG. 6).

In terms of the connection between the pivot connecting portion 51 of the control member 50 and the pivot shaft 22 of the tool body 20 and the connection between the driving portion 52 of the control member 50 and the driven portion 42 of the intake valve 40, although the pivot shaft 22 is a protrusion formed on the tool body 20 and the driven portion 42 is a protrusion formed on the intake valve 40 in this embodiment, it can be contemplated in other embodiments that the pivot shaft 22 is modified to be an independent pin separatable from the tool body 20 and configured to be plugged into the pivot connecting portion 51 and a hole of the tool body 20, and that the driven portion 42 is modified to be an independent pin separatable from the intake valve 40 and configured to be plugged into the driving portion 52 and a hole of the intake valve 40.

In addition, the control member 50 is rotatable about the pivot shaft 22 as a second axis 55, and the second axis 55 and the first axis 43 separate from each other and do not overlap.

The above description is for exemplarily explaining the configuration of the main components of the embodiment of the invention. The operation mode and technical effect of the present invention are exemplarily explained as follows.

As shown in FIGS. 5, 7 and 8, when the user pushes the control portion 53 on the right side of the control member 50 towards the left to the forward rotation control position (as shown in FIG. 5), the control member 50 can counterclockwise rotate by an angle about the pivot shaft 22 of the tool body 20 as the pivot center (namely the second axis 55), to drive the intake valve 40 to counterclockwise rotate by an angle about the first axis 43 as the rotation center, so that the vent 41 of the intake valve 40 is in communication with the clockwise rotation hole 31 of the valve sleeve (as shown in FIG. 8). In this way, the compressed air is introduced to the clockwise rotation intake channel 28 of the tool body 20 (as shown in FIG. 7), so as to switch the pneumatic tool to a forward rotation mode.

Similarly, as shown in FIGS. 6 and 9, when the user pushes the control portion 53 on the left of the control member 50 towards the right to the reverse rotation control position (as shown in FIG. 6), the control member 50 can clockwise rotate by an angle about the pivot shaft 22 of the tool body 20 as a pivot center (i.e., the second axis 55), to drive the intake valve 40 to clockwise rotate by an angle about the first axis 43 as a rotation center, so that the vent 41 of the intake valve 40 is in communication with the counterclockwise rotation hole 32 of the valve sleeve 30. In this way, the compressed air is introduced to the counterclockwise rotation intake channel 29 of the tool body 20, so as to switch the pneumatic tool to a reverse rotation mode.

Accordingly, by pressing or pushing the control member 50 to the forward or reverse rotation control position, the vent 41 of the intake valve 40 is in communication with corresponding one of the clockwise rotation hole 31 and counterclockwise rotation hole 32 of the valve sleeve 30 to control the pneumatic tool to perform corresponding one of the forward and reverse rotation. The invention has at least the following technical effects.

First, have a low assembly cost and production cost. Because the pivot connecting portion 51 of the control member 50 is pivotally connected to the pivot shaft 22 of the tool body 20 and the driving portion 52 of the control member 50 can drive the driven portion 42 of the intake valve 40, the control member 50 s presses the intake valve 40 along an arc trajectory to rotate, so as to switch the control member 50 to one of the forward or reverse rotation control positions, and thus controlling the pneumatic tool to rotate forward or reversely. Accordingly, the present invention can control the forward and reverse rotation of the pneumatic tool with less components and a simple structure, so that the assembly cost and production cost and the cumulative risk of accuracy decline, which is derived from the transmission mechanism with too many components, can be effectively reduced.

Second, enable a smaller operation angle and achieve the effect of similar horizontal switching. In the driving structure design of the intake valve 40 and the control member 50 in cooperation, the control member 50 is pivotable on the pivot shaft 22 of the tool body 20 as a pivot center (i.e., the second axis 55) to drive the intake valve 40 to rotate about the first axis 43 as a rotation center, and the second axis 55 and the first axis 43 are separated and do not overlap. Therefore, the pivot center of the control member 50 and the rotation center of the intake valve 40 are not in the same axis, so that a pivot angle, i.e., the operation angle, of the control member 50 is less and is sufficient for the control member 50 to control the rotation of the intake valve 40 and control the switching of forward and reverse rotation of the pneumatic tool, to achieve the effect of similar horizontal switching.

Third, provide a labor-saving control of rotation direction switching. As shown in FIG. 5, the linear distance L1 from each control portion 53 of the control member 50 to the pivot shaft 22 is designed to be longer than the linear distance L2 from the driven portion 42 of the intake valve to the pivot shaft 22, so that the effort arm from each control portion 53 of the control member 50 to the pivot shaft 22 is longer than the load arm from the driven portion 42 of the intake valve 40 to the pivot shaft 22, whereby the effort to control the rotation direction switching can be saved more.

Fourth, provide a more accurate or unambiguous control of direction switching.

Referring to FIGS. 5 and 6, by the cooperation of the limiting indentation 54 of the control member 50 and the limiting rib 23 of the tool body 20, the first limiting surface 541 of the control member 50 leans against a first side surface of the limiting rib 23 when the control member 50 is in the forward rotation control position (as shown in FIG. 5), so that the vent 41 of the intake valve 40 is exactly aligned with and in communication with the clockwise rotation hole 31 of the valve sleeve (see FIG. 8), whereby an accurate/unambiguous control of rotation direction switching can be achieved. Similarly, when the control member 50 is in the reverse rotation control position, the second limiting surface 542 of the control member 50 leans against a second side surface of the limiting rib 23 opposite to the first side surface (as shown in FIG. 6), whereby an accurate/unambiguous control of rotation direction switching can also be achieved. Therefore, the present invention can prevent the control member 50 from overly rotating clockwise and overly rotating counterclockwise, to avoid the obstruction of compressed air flow caused by the mutual misalignment of the vent 41 of the intake valve 40 with the clockwise rotation hole 31 or the counterclockwise rotation hole 32 of the valve sleeve 30.

What is claimed is:

1. A rotation direction switching device of a pneumatic tool, suitable for being installed to a tool body, the tool body including an accommodating chamber and a pivot shaft located outside the accommodating chamber, and the rotating direction switching device comprising:

a valve sleeve fixed in the accommodating chamber of the tool body, and including a clockwise rotation hole and a counterclockwise rotation hole;

an intake valve rotationally disposed in the valve sleeve, and including a vent selectively communicable with the clockwise rotation hole and the counterclockwise rotation hole, and a driven portion; and a control member being movable between a forward rotation control position and a reverse rotation control position by taking the pivot shaft of the tool body as a pivot center, and including a pivot connecting portion pivotally connected with the pivot shaft of the tool body, a driving portion for driving the driven portion, and two control portions being pressable and respectively located on two sides of the driving portion, the vent of the intake valve being in communication with the clockwise rotation hole of the valve sleeve when the control member is in the clockwise rotation control position, and the vent of the intake valve being in communication with the counterclockwise rotation hole of the valve sleeve when the control member is in the counterclockwise rotation control position.

2. The rotating direction switching device of the pneumatic tool as claimed in claim 1, wherein a linear distance from each of the control portions of the control member to the pivot shaft is longer than a linear distance from the driven portion of the intake valve to the pivot shaft.

3. The rotating direction switching device of the pneumatic tool as claimed in claim 1, wherein the driven portion of the intake valve is a pillar, and the driving portion of the control member is a hollow.

4. The rotating direction switching device of the pneumatic tool as claimed in claim 1, wherein the intake valve is rotatable about a first axis, the control member is pivotable on the pivot shaft as a second axis, and the second axis and the first axis separate from each other.

5. The rotating direction switching device of the pneumatic tool as claimed in claim 4, wherein the pivot connecting portion and the driving portion of the control member are respectively located on two sides of the first axis.

6. The rotating direction switching device of the pneumatic tool as claimed in claim 1, wherein the tool body further includes a limiting rib adjacent to the accommodating chamber, the control member further includes a limiting indentation between the control portions, the limiting indentation includes a first limiting surface located at one of two opposite sides of the limiting rib, and a second limiting surface facing the first limiting surface and located at the other one of the two opposite sides of the limiting rib; when the control member is in the forward rotation control position, the first limiting surface is abutted against the one of the two opposite sides of the limiting rib; and when the control member is in the reverse rotation control position, the second limiting surface is abutted against the other one of the two opposite sides of the limiting rib.

* * * * *